US00RE34560E

United States Patent [19]

Schnaars

[11] E Patent Number: Re. 34,560

[45] Reissued Date of Patent: Mar. 8, 1994

[54] SEMI-BULK WITH LINER

[75] Inventor: Daniel R. Schnaars, Lafayette, La.

[73] Assignee: Flexcon & Systems, Inc., Lafayette, La.

[21] Appl. No.: 927,064

[22] Filed: Aug. 6, 1992

Related U.S. Patent Documents

Reissue of:

[64] Patent No.: 4,946,291
Issued: Aug. 7, 1990
Appl. No.: 251,020
Filed: Sep. 27, 1988

U.S. Applications:

[63] Continuation of Ser. No. 59, Jan. 2, 1987, abandoned.

[51] Int. Cl.[5] ..... B65D 88/16; B65D 90/04

[52] U.S. Cl. ..... 383/113; 383/6; 383/41; 383/67; 383/109; 383/117; 383/904; 383/906

[58] Field of Search ..... 383/6, 41, 67, 109, 383/111, 113, 114, 904, 906; 220/460, 462; 493/933

[56] References Cited

U.S. PATENT DOCUMENTS

| | | | |
|---|---|---|---|
| 3,576,154 | 4/1971 | Brockmuller | 493/933 X |
| 3,630,798 | 12/1971 | Wicks | 493/217 X |
| 3,929,275 | 12/1975 | Bolling et al. | 383/111 |
| 4,224,970 | 9/1980 | Williamson et al. | 383/117 X |
| 4,340,379 | 7/1982 | Williamson | 493/933 X |
| 4,505,694 | 3/1985 | Okushita | 493/101 |
| 4,516,906 | 5/1985 | Krein | 220/462 X |
| 4,597,102 | 6/1986 | Nattrass | 383/119 X |
| 4,628,535 | 12/1986 | Tetenborg | 383/109 X |
| 4,658,989 | 4/1987 | Bonerb | 383/109 X |
| 4,671,733 | 6/1987 | Krein | 220/462 X |

FOREIGN PATENT DOCUMENTS

| | | | |
|---|---|---|---|
| 105238 | 4/1984 | European Pat. Off. | 383/117 |
| 158361 | 10/1985 | European Pat. Off. | 383/111 |
| 1505583 | 3/1978 | United Kingdom | 383/904 |
| 2160498 | 12/1985 | United Kingdom | 383/109 |

*Primary Examiner*—Sue A. Weaver
*Attorney, Agent, or Firm*—Pravell, Hewitt, Kimball & Krieger

[57] ABSTRACT

A plastic or like material liner inserted within a fabric type bulk bag so that the liner is secured in position within the bag with an adhering means along substantially the outer surface of the liner for adhering to the inner most surface of the bulk bag at strategic points, and a second adhering means for adhering the lower portion of the bulk bag to the liner at substantially the point of exit of bulk contained within the bag, so that release bulk from a lower spout would not tend to dislodge the liner from its lined position within the bag. The invention would also include the process for inserting the liner within the bag which would include inserting the liner to the body portion of the bag; closing off the lower most exit chute of the liner; forcing a pressurized air to the liner so that the liner is inflated within the bag; maneuvering the liner within the bag while inflated to assure that the liner is substantially free of creases or void space between the liner and the bag; deflating the bag and liner while the liner is in position within the exterior bag.

10 Claims, 2 Drawing Sheets

SEMI-BULK WITH LINER

Matter enclosed in heavy brackets [ ] appears in the original patent but forms no part of this reissue specification; matter printed in italics indicates the additions made by reissue.

This is a *reissue of U.S. Pat. No. 4,946,291 which is a* continuation of co-pending application Ser. No. 000,059 filed on Jan. 2, 1987, now abandoned.

BACKGROUND OF THE INVENTION:

1. Field of the Invention;

The present invention relates to semi-bulk bags. More particularly, the present invention relates to a semi-bulk bag having an exterior fabric layer and an interior polyethlene liner glued therein for assuring maintenance of the liner while the contents of the bag are dumped, and also provides for a process to assure the liner in proper position within the bag.

2. General Background:

In the art of transporting of dry, free-flowing bulk materials such as sugar, flour, resins, etc., or even certain waste products, the use of bulk bags are well known to the industry, the bags consisting primarily of an upper receiving portion for receiving contents within the bag. The bag is then transported and a lower discharge outlet which would be sealed during transport is opened into a receiving bin, and the contents would be poured therefrom through the discharge outlet. In addition, material fabric bulk bags may be required to have an inner polyethylene liner for complete moisture, or contamination control, or federal requirements are such that the contents such as food products must be sealed within the polyethylene liner for purpose of purity as opposed to a plain fabric bag.

Although this type of system is common in the industry, there are several shortcomings in the present state of the art which need addressing. In particular, in the system whereby the polyethylene liner is insertable into the exterior fabric bag, the liner, of course, often times is simply a cylindrical continuous wall liner, which is inserted into the bag and tied off at the bottom end, with the contents poured into the top neck of the liner. As the inner liner fills out with contents, it theoretically fills out into the exterior fabric bag for transport. However, what often occurs is that as the liner is receiving the product, folds or creases in the liner prevent it from conforming to the shape of the exterior bag, and therefore the result is a void between the liner and the fabric bag, which is not filled, and therefore less contents are carried in the bag as would normally be available.

Perhaps a more significant problem is the problem encountered upon the bag releasing its contents through the lower discharge outlet as was described earlier. As the contents pour from the fabric bag and the liner, because the fact that the liner is not secured within the bag, the result is often that the liner itself will be pulled from the bag through the force of the pouring contents, and as often occurs, the liner itself would drop into the container, whether it be a bin or another type of receiving container. This, of course, is particularly undesirable in view of the fact the contents, which often times may be food substances, have in effect, become contaminanted by the liner being allowed to reside in the bin following pouring of the contents therefrom.

There are several patents which have been discovered as a result of a search of the art on the subject of liners and method of securing liners within an exterior of the frames, the most pertinent being as follows:

U.S. Pat. No. 4,505,694 issued to Okushita, entitled "Apparatus For Fabricating A Bag And Box Package", relates to a bag made of substantially rectangular superimposed layers of flexible material hermetically sealed and upon inflation of the bag, the bag comes into close contact with the box ready to receive the desired product through a filament attached thereto.

U.S. Pat. No. 4,516,906 issued to Krein, entitled "Free Standing Waterproof Lining For Truck Industry", relates to a method of installing a continuous moisture proof film liner within a conventional cargo trailer by blowing a gentle stream of air into the bag as sufficient tension is applied to the upper edge and surface to direct the air into the rear of the trailer. It would simply be adhered to place via contact with the sides and the top of the container.

U.S. Pat. No. 3,576,154 issued to Breckmuller, entitled "Process And Apparatus For Manufacturing Bags Comprising a Liner Bag Which Protrudes From The Opening", involves a process which is related to the bag construction as to the inclusion of a liner bag within an exterior bag.

U.S. Pat. No. 3,630,798 issued to Wicks, entitled "Method Of Making Plastic-Lined Burlap Bag", teaches a method of forming a line bag extruding a strip of thermal plastic adhesive along an edge of a piece of bag allowing it to dry and forming a bag with the external stitch side and bottom seams with the adhesive strips along the outer edge of the open top.

U.S. Pat. No. 3,929,275 issued to Bolling, et al, entitled "Bags With Film Liners And Method Of Making, relates to a method of making a bag whereby flat nongusseted plastic film tubing heat sealed transversely the tube length and can be combined with the Weber paper and a conventional bag machine to form a bag with a film liner.

U.S. Pat. No. 4,340,379 issued to Williamson, entitled "Reinforced Container For Bulk Material", relates to a container in the manufacture thereof for a reinforced receptacle for containing bulk material having a coextruded plastic multiplied tube having at least an inner and outer ply and having an upper and lower end with the reinforced sheet wrapped around the multiplied tube and encompassing the tube from the lower end to a hide-away so that the receptacle is filled with the bulk material.

SUMMARY OF THE PRESENT INVENTION

The apparatus and process of the present invention solves the problems confronted in the present state of the art in a simple and straightforward manner. What is provided is a plastic or like material liner inserted within a fabric type bulk bag so that the liner is secured in position within the bag with a first adhering means at strategic points along the outer surface of the liner for adhering to the inner most surface of the bulk bag, and a second adhering means for adhering the lower portion of the bulk bag to the liner at substantially the point of exit of bulk contained within the bag, so that release of bulk from a lower discharge spout would allow the liner to remain in position within the bag. The invention would also include the process for inserting the liner within the bag which would include inserting the liner through the body portion of the bag; closing off the lower most discharge spout of the liner; forcing pressurized air into the liner so that the liner is inflated within the bag; maneuvering the liner within the bag while inflated to assure that the liner is substantially free of creases or void space between the liner and the bag; deflating the bag and liner while the liner is in position within the exterior bag.

Therefore, it is a principal object of the present invention is to provide a bulk bag having a plastic liner therein, with the liner having a bottom discharge outlet so that when removal of bulk is achieved the liner is maintained within the exterior bag;

It is still a principal object of the present invention to provide a process for installing a liner within an outer fabric bulk bag in such a manner so that there are no void spaces between the liner and the bag when the bulk is received into the bag;

It is still a further object of the present invention to provide an adhering means between the exterior fabric bulk bag and an interior plastic liner so that upon the liner making substantial contact with the inner surface of the bag the liner is adhered to the inner surface at strategic points so as to avoid any movement or flow of the liner out of the bag as contents within the bulk bag are removed;

It is still a further object of the present invention to provide a process for enabling a liner within a bulk bag to be positioned within the bulk bag prior to utilization of the bulk bag in such a manner that the liner conforms substantially to the shape of the bulk bag when the bulk bag is filled with bulk product.

Figure 1:
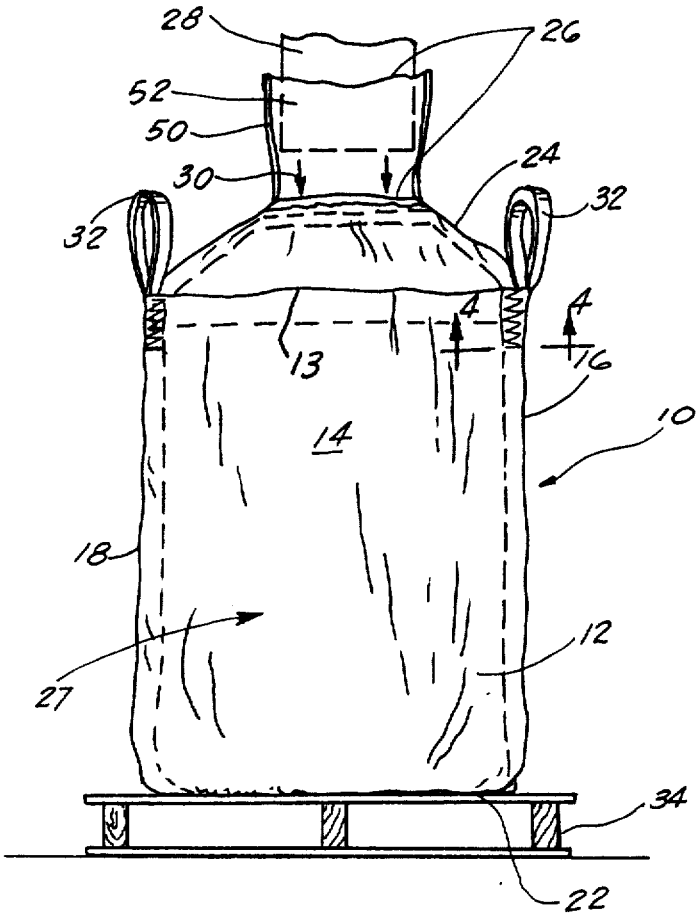
FIG. 1 is an overall side view of the bulk bag containing a liner in the preferred embodiment of the apparatus of the present invention.

DETAILED DESCRIPTION OF THE PREFERRED EMBODIMENT:

FIGS. 1-5 illustrate the apparatus and the process of the present invention with the bulk bag being illustrated by the numeral 10. As seen in FIG. 1, bulk bag 10 would comprise an outer fabric bag 12 when filled with bulk substantially comprising an upright bag having four sides 14, 16, 18 and 20 and a substantially flat bottom portion 22 and an upper portion 24, which can be in several forms such as, cone-shaped, with full spout, flat-shaped with full spout, or full-open duffle style, having an upper open end 26 therein, the wall portions, floor portions and cone portion of the bag defining an interior storage space 27 therein for storage of the bulk. For purposes of description the bulk bag is a typical type of bag utilized in the transport of bulk through the open end 26 allowing the flow of contents from a chute 28, with the contents flowing into the bag as indicated by arrows 30. Bulk bag 10 would normally be comprised of a plain or coated fabric which could be sewn or adhered to form the bag itself having a sleeve lift 32 at each of its upper corners for lifting and placing in position during transport.

As seen in FIG. 1, also bulk bag 10 after being filled with bulk has been rested upon a pallet 34 which is quite standard in the art, but not necessary to the art, so that it may be lifted and moved elsewhere in a warehouse or the like.

As was discussed earlier, bulk bag 10 would serve as an outer fabric container for the bulk contained within bulk space 27. For use with the present invention would be of the type of a storage bulk bag which would further comprise an interior heavy plastic or polyethlene liner 50, the liner 50 as seen for example in FIG. 1 having an upper neck portion 52 which would extrude out of the opening 26 in bulk bag 10 and surround the pour spout 28 so that any contents poured within the bulk bag of course would pour within liner 50. Liner 50 of course will be utilized in most instances where sensitive bulk such as food or the like must not make contact with the exterior bag 10. As seen in the FIGURES, since in fact the bulk bag 10 would be the type of bulk bag that would release its contents from a discharge outlet 29 as seen in FIG. 2, again liner 50 would have a lower neck portion 54 which would extrude out from the bottom spout 29 of bulk bag 10 so that as the contents pour from the bulk bag 10 they would pour from spout 54 into a receiving bin for storage after transport.

There is nothing unconventional in regard to an exterior bulk bag such as bulk bag 10 having an interior lining such as lining 50 therewithin; that structure being known in the art. The combination which is concerned in the present invention is the method of making, and the method of inserting the liner within bulk bag 10 to assure that the liner is conformed to the shape of bulk bag 10 and is not released as the contents of the bulk bag are released through spout 54.

Figure 3:
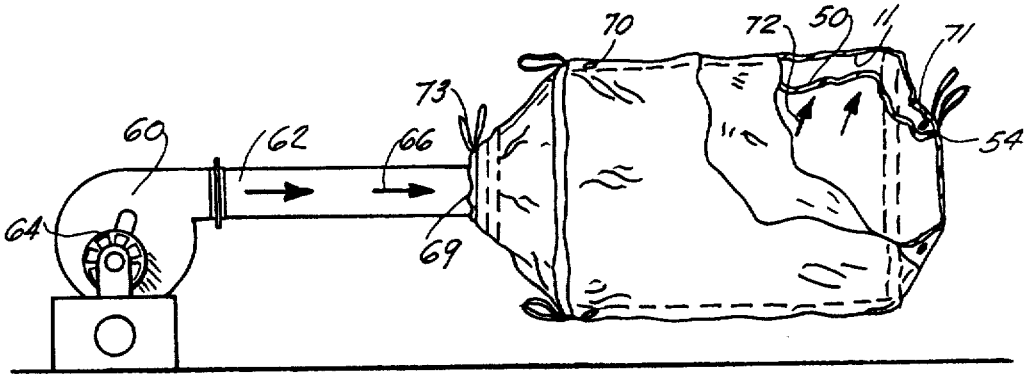
FIG. 3 is a side partial cut-away view of the bulk bag wherein a liner is being inserted therein.

Turning now to FIG. 3, one of the means for achieving this end would include a air blower 60 having an extendible air conveying portion 62 with the air blower 60 operated by a motor the like 64 for conveying air down portion 62 as indicated by the direction of arrows 66. Bulk bag 10 as seen in the FIGURE would be inserted onto the end portion 69 of air conveying section 62, after liner 50 has been inserted into the bulk bag, with the liner 50 tied off via a tie string or the like 73 at point 69. The lower most bottom spout 54 of liner 50 has been tied off so that any air received within liner 50 is therefore unable to flow through the bag in the process. After the bulk bag and liner which would normally be in the collapsed position are placed on lower extension 62, air is then forced into the bulk bag and liner and the liner within the bulk bag begins to expand with the bulk bag and to conform to the shape and size of the bulk bag as indicated by arrows 72 in FIG. 3. During the process while the liner is being blown to conform to the bag, it may be necessary that the liner in the bag being adjusted by pounding or shifting so that one is assured that the exterior wall 51 of liner 50 conforms to the inner wall 11 of bulk bag 10. Therefore, once the liner is in place one is assured that when contents are poured into the bag the liner will conform to the shape of the bulk bag.

Following the inflation of the liner within bulk bag 10 and the conforming of the shapes, blower 60 is then turned to the off position, the bag and liner are removed from the extension 62, and the bulk bag with liner contained therein are folded and may be stacked for further use in the future.

Figure 2:
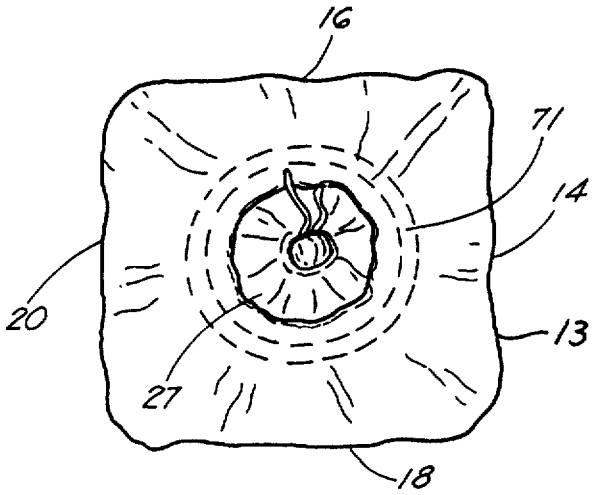
FIG. 2 is a bottom view of a bulk bag containing a liner in the preferred embodiment of the apparatus of the present invention.

Prior to the inflation of the liner within the bulk bag, as seen in FIG. 3, it is necessary that there be achieved a means for maintaining the liner within the bulk bag after it has achieved its inflation against the wall of the bulk bag so that when the contents are removed from the bulk bag to the lower spout 54, the liner is maintained in place. The means for achieving this is illustrated in particularly in FIGS. 3 and 4, which illustrates that a continuous layer of glue 68, (which may be of the type which is quick drying upon contact) is placed along the interior wall portion 11 of he bulk bag 10 at approximately the point adjacent the upper shoulders 13 where the top portion 24 is joined to the wall portion of the bag, so that preferably continuous adhesion means 70 is defined at that point, although the adhesion means must be sufficient to maintain the liner in place. Further, a second layer of glue to define a second adhesion means is placed on the interior 11 of bulk bag 10 as indicated in FIG. 2 forming preferably a continuous circle of glue 71 around the pour spout 29 of bulk bag 10. Although preferably the portion of the adhesion layers are along the top and exit point of the bag, it is understood that the glue could be applied in other strategic areas, the result intended to maintain the liner in place.

Figure 4:
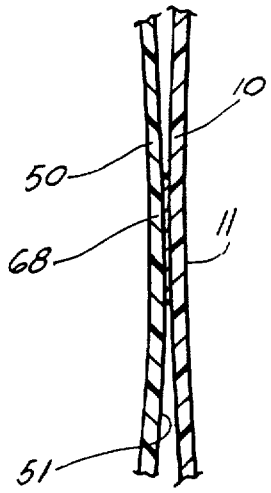
FIG. 4 is a partial cross sectional view along lines 4—4 in FIG. 1 illustrating the adhering contact between the bulk bag and the liner.
Figure 5:
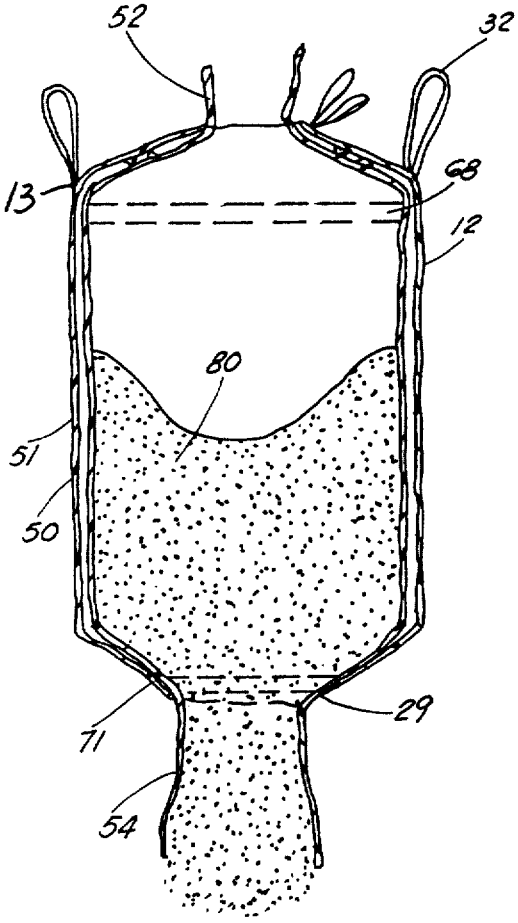
FIG. 5 is a cross sectional view of a bulk bag while bulk is being dumped therefrom.

Therefore, after the glue has been applied as a continuous adhesion means 70 of the upper portion of the bag and means 71 on the lower most portion of the bag, upon inflation of the liner within the bulk bag, the liner 50 is forced to make contact with the inner surface 11 of bulk bag 10 and therefore an adhesion occurs and those two strategic points as seen in FIG. 4. It should be noted that the adhesion between the inner liners and the bag is accomplished by the glue, and there is no need for stitching, taping or other contact means between the liner and the bag. Therefore, upon contents being poured into the bag and out of the bag as seen in FIG. 5, the removal of the contents will not allow folding and slippage of the interior liner 50 but it will be retained in place during the removal process.

Figure 6:
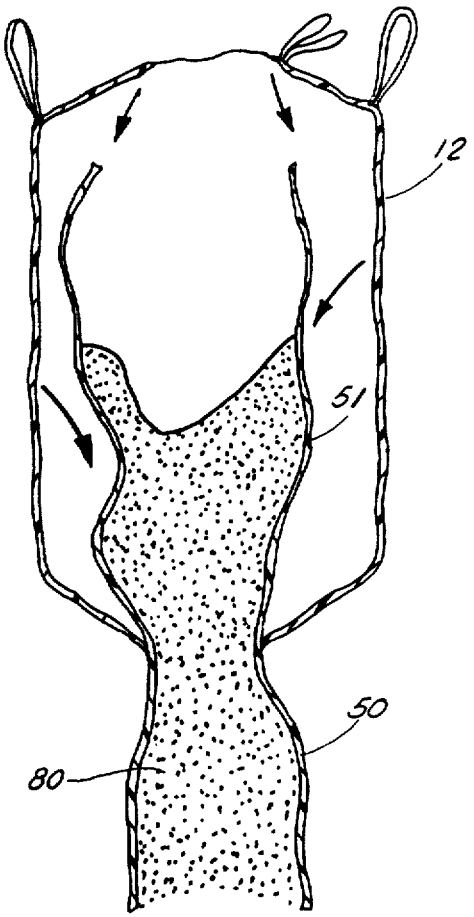
FIG. 6 (PRIOR ART)
FIG. 6 is a view of the present state of the art indicating the movement of the liner out of a bulk bag during dumping of the bulk therefrom.

FIG. 6 has been included in the FIGURES to illustrate the results which often occur to liner 50 prior to the present invention, when liner 50 simply was placed within bag 10. Upon removal of the contents, liner 50 tends to follow the movement of the contents 80 out of bulk bag 10 and often times extruded into the materials contained in the receiving bin or worse yet, was pulled completed from the bulk bag and resided in the contents thus causing perhaps possible contamination of the contents.

As was stated earlier, the critical steps of the placement of an adhesion means within the interior of the outer bulk bag 10 to adhere to the inner liner upon inflation and to remain adhered during the shipment and pouring of the bulk out of the bag solves one problem confronted, and the fact that the liner is inflated within the bulk bag so that it would conform to the shape of the bulk bag and avoid any possibility of void spaces between the liner and the bulk bag solves the second problem, which the overall apparatus and process for achieving these ends have been discussed herein.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A storage bag for transporting bulk material, the bag having an upper inlet opening, the bag comprising:

(a) an exterior fabric bag portion comprising a plurality of wall portions, a floor portion and a top portion, all defining a bulk storage space therewithin;

(b) a collapsed interior plastic-like liner means contained within the bag portion and at least comprising a continuous wall portion, for storing bulk material therein;

(c) glue circumferentially placed on the wall portions of the exterior bag portion along the bulk storage space in at least two spaced apart positions, a first position being adjacent and surrounding the upper inlet opening, serving as a permanent adhesive contact between the wall portion of the interior liner means and the wall portions of the exterior bag portion, so that the collapsed interior liner means adheres to the wall portions of the exterior bag portion when the collapsed interior liner means expands and makes contact with the wall portions of the exterior bag portion; and (d) means associated with the collapsed interior liner means for providing that the wall portion of the collapsed interior liner means substantially conforms to and abuts against the wall portions of the exterior bag portion when the interior liner means expands and makes contact with the exterior bag portion.

2. The storage bag in claim 1, wherein the exterior bag portion comprises a shoulder portion where the top portion meets the wall portions, and the circumferentially placed glue at the first position comprises a continuous layer of glue and the first position is adjacent the shoulder portion.

3. The storage bag in claim 1, wherein the interior liner means conforms to the shape of the exterior bag portion during transport of bulk material therein.

4. A storage bag for transporting bulk material therein of the type comprising an exterior fabric bag portion having a top portion, a plurality of wall portions including an upper portion adjacent the top portion, and a floor portion, all defining a storage space therewithin, and including an inlet opening on the top portion and an outlet opening on the floor portion, the storage bag comprising:

(a) a free-form interior plastic liner positioned within the exterior bag portion and including a continuous wall portion, for housing bulk material stored therein, the free-form interior liner conforming to the shape of the wall portions of the exterior bag portion when bulk material is added to the storage space and contained within the exterior bag portion; and (b) a layer of glue circumferentially applied upon the wall portions of the exterior bag portion along the storage space in two spaced apart positions, at least one position being adjacent to the inlet opening at the upper portion, so that when the free-form interior [line] *liner* is expanded to conform to the shape of the exterior bag portion, the wall portion of the free-form interior liner adheres to the wall portions of the exterior bag portion where the glue has been applied to prevent the free-form interior liner from moving out of the outlet opening on the floor portion of the exterior bag portion as bulk material is emptied therefrom, the glue serving as a permanent adhesive contact between the wall portion of the interior liner and the wall portions of the exterior bag portion.

5. A storage bag for transporting bulk material, the bag having an upper inlet opening and a lower [outer] *outlet* opening, the bag comprising:

(a) an exterior fabric bag portion comprising a plurality of wall portions, a floor portion, and a top portion all defining a bulk storage space therewithin;

(b) an interior free-form plastic-like liner means insertable into the exterior fabric bag portion in a collapsed configuration and when expanded conformable to fit the configuration of the exterior fabric bag portion, the interior plastic-like liner means at least comprising a continuous wall portion, for storing bulk material therein;

(c) glue circumferentially placed on the wall portions of the exterior bag portion along the bulk storage space in at least two spaced apart positions, at least one position being adjacent one of the upper opening, serving as a permanent adhesive contact between the wall portion of the interior liner means and the wall portions of the exterior bag portion, so that the interior liner means adheres to the wall portions of the exterior bag portion when the interior liner means expands from the collapsed configuration and makes contact with the wall portions of the exterior bag portion; and (d) means associated with the interior liner means for providing that the wall portion of the interior liner means substantially conforms to and abuts against the wall portions of the exterior bag portion when the interior liner means makes contact with the exterior bag portion.

*6. A storage bag for transporting bulk material, the bag having an upper inlet opening, the bag comprising:*

*(a) an exterior fabric bag portion comprising a plurality of wall portions, a floor portion and a top portion, all defining a bulk storage space therewithin;*

*(b) a collapsed interior plastic-liner means contained within the bag portion and at least comprising a continuous wall portion, for storing bulk material therein;*

*(c) glue circumferentially placed on the wall portions of the exterior bag portion along the bulk storage space in at least a first position adjacent and surrounding the upper inlet opening, serving as a permanent adhesive contact between the wall portion of the interior liner means and the wall portions of the exterior bag portion, so that the collapsed interior liner means adheres to the wall portions of the exterior bag portion when the collapsed interior liner means expands and makes contact with the wall portions of the exterior bag portion; and*

*(d) means associated with the collapsed interior liner means for providing that the wall portion of the collapsed interior liner means substantially conforms to and abuts against the wall portions of the exterior bag portion when the interior liner means expands and makes contact with the exterior bag portion.*

*7. The storage bag in claim 6, wherein the exterior bag portion comprises a shoulder portion where the top portion meets the wall portions, and the circumferentially placed glue at the first position comprises a continuous layer of glue and the first position is adjacent the shoulder portion.*

*8. The storage bag in claim 6, wherein the interior liner means conforms to the shape of the exterior bag portion during transport of bulk material therein.*

*9. A storage bag for transporting bulk material therein of the type comprising an exterior fabric bag portion having a top portion, a plurality of wall portions including an upper portion adjacent the top portion, and a floor portion, all defining a storage space therewithin, and including an inlet opening on the top portion and an outlet opening on the floor portion, the storage bag comprising:*

*(a) a free-form interior plastic liner positioned within the exterior bag portion and including a continuous wall portion, for housing bulk material stored therein, the free-form interior liner conforming to the shape of the wall portions of the exterior bag portion when bulk material is added to the storage space and contained within the exterior bag portion; and*

*(b) a layer of glue circumferentially applied upon the wall portions of the exterior bag portion along the storage space in at least one position adjacent one of the openings, so that when the free-form interior liner is expanded to conform to the shape of the exterior bag portion, the wall portion of the free-form interior liner adheres to the wall portions of the exterior bag portion where the glue has been applied to prevent the free-form interior liner from moving out of the outlet opening on the floor portion of the exterior bag portion as bulk material is emptied therefrom, the glue serving as a permanent adhesive contact between the wall portion of the interior liner and the wall portions of the exterior bag portion.*

*10. A storage bag for transporting bulk material, the bag having an upper inlet opening and a lower outlet opening, the bag comprising:*

*(a) an exterior fabric bag portion comprising a plurality of wall portions, a floor portion, and a top portion all defining a bulk storage space therewithin;*

*(b) an interior free-form plastic-like liner means insertable into the exterior fabric bag portion in a collapsed configuration and when expanded conformable to fit the configuration of the exterior fabric bag portion, the interior plastic-like liner means at least comprising a continuous wall portion, for storing bulk material therein;*

*(c) glue circumferentially placed on the wall portions of the exterior bag portion along the bulk storage space in at least one position adjacent one of the openings, serving as a permanent adhesive contact between the wall portion of the interior liner means and the wall portions of the exterior bag portion, so that the interior liner means adheres to the wall portions of the exterior bag portion when the interior liner means expands from the collapsed configuration and makes contact with the wall portions of the exterior bag portion; and*

*(d) means associated with the interior liner means for providing that the wall portion of the interior liner means substantially conforms to and abuts against the wall portions of the exterior bag portion when the interior liner means makes contact with the exterior bag portion.*

* * * * *